US010920370B2

(12) United States Patent
Wever et al.

(10) Patent No.: US 10,920,370 B2
(45) Date of Patent: Feb. 16, 2021

(54) SURFACE COVERINGS INCLUDING CARBON SEQUESTERING MATERIALS AND METHODS OF MAKING

(71) Applicant: INTERFACE, INC., Atlanta, GA (US)

(72) Inventors: Johannes Lieuwe Wever, Apeldoorn (NL); Stuart Jones, LaGrange, GA (US); Andre Culpepper, Villa Rica, GA (US); James Hobbs, LaGrange, GA (US); Luca Achilli, London (GB); Teddy Buntara, Elst (NL); Connie Daniel Hensler, Kennesaw, GA (US); John Bradford, LaGrange, GA (US); William Nathan Jones, West Point, GA (US); Michael Lindsay Boyd, Maianbar (AU)

(73) Assignee: Interface, Inc., Atlanta, GA (US)

( * ) Notice: Subject to any disclaimer, the term of this patent is extended or adjusted under 35 U.S.C. 154(b) by 0 days.

(21) Appl. No.: 16/739,078

(22) Filed: Jan. 9, 2020

(65) Prior Publication Data

US 2020/0217012 A1 Jul. 9, 2020

Related U.S. Application Data

(60) Provisional application No. 62/790,349, filed on Jan. 9, 2019, provisional application No. 62/791,162, filed on Jan. 11, 2019.

(51) Int. Cl.
*D06N 3/16* (2006.01)
*D06N 3/00* (2006.01)
*B01J 20/20* (2006.01)
*B01J 20/24* (2006.01)
*B01J 20/26* (2006.01)
*B01J 20/28* (2006.01)
*D06N 3/12* (2006.01)

(52) U.S. Cl.
CPC ............ *D06N 3/0063* (2013.01); *B01J 20/20* (2013.01); *B01J 20/24* (2013.01); *B01J 20/261* (2013.01); *B01J 20/264* (2013.01); *B01J 20/2803* (2013.01); *B01J 20/28007* (2013.01); *B01J 20/28016* (2013.01); *D06N 3/004* (2013.01); *D06N 3/0011* (2013.01); *D06N 3/123* (2013.01); *D06N 3/16* (2013.01); *D06N 2201/0263* (2013.01); *D06N 2201/082* (2013.01); *D06N 2209/121* (2013.01); *D06N 2211/066* (2013.01)

(58) Field of Classification Search
CPC .... D06N 3/0063; D06N 3/0011; D06N 3/004; D06N 3/123; D06N 3/16; D06N 2201/0263; D06N 2201/082; D06N 2209/121; D06N 2211/066; B01J 20/20; B01J 20/24; B01J 20/261; B01J 20/264; B01J 20/28007; B01J 20/28016; B01J 20/2803
See application file for complete search history.

(56) References Cited

U.S. PATENT DOCUMENTS

| | | | |
|---|---|---|---|
| 4,443,575 A | 4/1984 | Iwai et al. | |
| 4,634,730 A | 1/1987 | Bogdany | |
| 6,248,834 B1 | 6/2001 | Mori | |
| 9,409,381 B2 | 8/2016 | Chang | |
| 9,637,615 B2 | 5/2017 | Fini | |
| 9,885,149 B2 | 2/2018 | Weeks et al. | |
| 10,071,335 B2 | 9/2018 | Lee | |
| 10,077,356 B2 | 9/2018 | Fini | |
| 10,301,228 B2 | 5/2019 | Bontchev et al. | |
| 2002/0060445 A1 | 5/2002 | Shirk et al. | |
| 2003/0119974 A1 | 6/2003 | Parikh et al. | |
| 2004/0191468 A1 | 9/2004 | Lattime et al. | |
| 2006/0080935 A1 | 4/2006 | Ddamulira et al. | |
| 2006/0134374 A1 | 6/2006 | Bell et al. | |
| 2008/0064852 A1 | 3/2008 | Ddamulira et al. | |
| 2009/0023836 A1 | 1/2009 | Nascimento et al. | |
| 2009/0249645 A1 | 10/2009 | Kajihara et al. | |
| 2010/0285246 A1 | 11/2010 | Becker et al. | |
| 2011/0008567 A1 | 1/2011 | Weeks et al. | |
| 2011/0189427 A1 | 8/2011 | Wells et al. | |
| 2012/0071597 A1 | 3/2012 | Aerts et al. | |
| 2013/0295371 A1 | 11/2013 | Peterson et al. | |
| 2014/0083331 A1 | 3/2014 | Fini | |
| 2015/0354143 A1 | 12/2015 | Pike | |
| 2016/0068659 A1 | 3/2016 | Moutinho et al. | |
| 2016/0134374 A1 | 5/2016 | Hu et al. | |
| 2016/0289512 A1 | 10/2016 | Bauers et al. | |

(Continued)

FOREIGN PATENT DOCUMENTS

| | | |
|---|---|---|
| CN | 2777110 | 5/2006 |
| CN | 101424121 | 5/2009 |

(Continued)

OTHER PUBLICATIONS

Translation of JP-2005198684-A; Seto, Yasutaro (Year: 2005).*
Activated Carbon, Biochar and Charcoal: Linkages and Synergies across Pyrogenic Carbon's ABCs; Hagemann (Year: 2018).*
U.S. Appl. No. 16/315,176, Non-Final Office Action dated Aug. 21, 2019, 13 pages.
Belletti et al., Experimental Research on Mechanical Properties of Biochar-Added Cementitious Mortars, accessed via internet at https://books.google.com/books?hl=en&lr=lang_en&id=EwKjDwAAQBAJ&oi=fnd&pg=PT415&dg=mould+growth+on+recycled+materials&ots=0TiND-FKPH&sig=wcKmYfHL7b_Ful99lx9X1nQMJVw#v=onepage&q&f=false, Proceedings of the fib Symposium 2019 on CONCRETE—Innovations in Materials, Design and Structures, May 27-29, 2019, 10 pages.
NL2017096 , "Search Report", Mar. 7, 2017, 10 pages.
International Application No. PCT/NL2017/050442, International Search Report and Written Opinion dated Sep. 19, 2017, 9 pages.

(Continued)

*Primary Examiner* — Christopher P Jones
(74) *Attorney, Agent, or Firm* — Kilpatrick Townsend & Stockton

(57) ABSTRACT

Floor coverings, such as modular panels or tiles, for installation on interior surfaces include an upper wear layer and a backing layer, where the backing layer includes a filler that includes concentrated carbon. The floor coverings can sequester carbon such that the resulting product has a negative carbon footprint when subjected to a Life Cycle Assessment.

28 Claims, 1 Drawing Sheet

(56) References Cited

U.S. PATENT DOCUMENTS

| | | |
|---|---|---|
| 2017/0152417 A1 | 6/2017 | Tichelaar et al. |
| 2017/0260371 A1 | 9/2017 | Fini |
| 2018/0066087 A1 | 3/2018 | Mohanty et al. |
| 2018/0094138 A1 | 4/2018 | Aerts et al. |
| 2018/0305621 A1 | 10/2018 | Weaver et al. |

FOREIGN PATENT DOCUMENTS

| | | |
|---|---|---|
| CN | 102575418 | 7/2012 |
| CN | 203201096 | 9/2013 |
| CN | 105694510 | 6/2016 |
| CN | 205276789 | 6/2016 |
| CN | 107536406 | 1/2018 |
| CN | 107660965 | 2/2018 |
| CN | 107660971 | 2/2018 |
| CN | 107660972 | 2/2018 |
| CN | 107660973 | 2/2018 |
| CN | 207345209 | 5/2018 |
| CN | 207449260 | 6/2018 |
| DE | 3406289 | 9/1985 |
| EP | 0369644 | 5/1990 |
| FR | 2702183 | 9/1994 |
| GB | 1443337 | 7/1976 |
| JP | 08105177 | 4/1996 |
| JP | 2613091 | 5/1997 |
| JP | 10237999 | 9/1998 |
| JP | 11229219 | 8/1999 |
| JP | 2000144949 | 5/2000 |
| JP | 2000144950 | 5/2000 |
| JP | 2000192568 | 7/2000 |
| JP | 2001064898 | 3/2001 |
| JP | 3535715 | 6/2004 |
| JP | 2005198684 | 6/2005 |
| JP | 2005198684 A * | 7/2005 |
| KR | 20000013937 | 3/2000 |
| KR | 20010010520 | 2/2001 |
| KR | 100370297 | 1/2003 |
| KR | 20030043260 | 6/2003 |
| KR | 20040067736 | 7/2004 |
| KR | 200391712 | 8/2005 |
| KR | 100524171 | 2/2006 |
| KR | 100554665 | 2/2006 |
| KR | 200421812 | 7/2006 |
| KR | 100889879 | 3/2009 |
| KR | 100894718 | 4/2009 |
| KR | 100972090 | 7/2010 |
| KR | 20110067344 | 6/2011 |
| KR | 101497426 | 3/2015 |
| KR | 101649963 | 8/2016 |
| KR | 20160096837 | 8/2016 |
| KR | 20160100663 | 8/2016 |
| KR | 20160133124 | 11/2016 |
| KR | 20170060776 | 6/2017 |
| WO | 9307790 | 4/1993 |
| WO | 2014152291 | 9/2014 |

OTHER PUBLICATIONS

International Application No. PCT/US2020/012993, "International Search Report and Written Opinion", Apr. 14, 2020, 14 pages.
U.S. Appl. No. 16/315,176, filed Jan. 4, 2019, 15 pages.
U.S. Appl. No. 16/315,176, Office Action dated Apr. 28, 2020, 12 pages.
"Comparison of European Biochar Certificate Version 4.8 and IBI Biochar Standards Version 2.0", Oct. 2014, 5 pages.
Alhashimi et al., "Life cycle environmental and economic performance of biochar compared with activated carbon: A meta-analysis", Resources, Conservation and Recycling, 118, 2017, pp. 13-26.
Bates et al., "Burn: Using Fire to Cool the Earth", Chelsea Green Publishing, Feb. 26, 2019, p. 154.
Gu et al., "Life Cycle Assessment of Activated Carbon From Woody Biomass", Wood and Fiber Science, 50(3), 2018, pp. 1-15.
McLaughlin, "An Overview of the current Biochar and Activated Carbon Markets", retrieved from the internet at https://www.biofuelsdigest.com/bdigest/2016/10/11/an-overview-of-the-current-biochar-and-activated-carbon-markets/, Oct. 11, 2016, 4 pages.
Bates et al., "Burn: Using Fire to Cool the Earth", Chelsea Green Publishing, Feb. 26, 2019, p. 34-57, 77-89, 151-163, 239-243.

* cited by examiner

SURFACE COVERINGS INCLUDING CARBON SEQUESTERING MATERIALS AND METHODS OF MAKING

CROSS-REFERENCE TO RELATED APPLICATIONS

This application claims priority to U.S. Provisional Application 62/790,349, filed on Jan. 9, 2019, and U.S. Provisional Application 62/791,162 filed on Jan. 11, 2019, the entire contents of each of which is incorporated herein in its entirety.

FIELD

Embodiments of the present invention relate to surface coverings such as floor coverings, and in particular to carpet tiles and other modular panels or tiles, specifically engineered to reduce, eliminate, and/or preferably render negative the carbon footprint of the product as measured by a Life Cycle Assessment.

BACKGROUND

Floor coverings typically include at least an exposed upper wear layer and a backing layer beneath the wear layer. Carpet tiles typically have an upper wear layer formed by tufting yarn into a primary backing fabric and coating the underside of the backing fabric with an adhesive material (often called a "precoat") to lock the yarns into the primary backing fabric. For purposes of this application, the term "face cloth" refers to a tufted primary backing fabric prior to precoat application (i.e., devoid of a precoat), and the term "half cloth" refers to a tufted primary backing fabric having a precoat (i.e., the yarn/primary backing fabric/precoat composite). The half cloth is then attached to a stabilizing structural backing composite to form a carpet web. The carpet web is then cut into carpet tiles of the desired shape and size.

FIGS. 1 and 2 are cross-sections illustrating examples of traditional carpet tile constructions 10, 11. The carpet tile constructions 10, 11 include yarns 17 tufted into a tufting primary 19 (also called a primary backing) to form a face cloth 14. In addition to being tufted, carpet tile half cloths may also be woven, nonwoven (e.g., needle-punched or needlefelt), fusion-bonded, etc. An adhesive or precoat layer 22 is positioned on the underside of the face cloth 14 to lock the yarns 17 into the tufting primary 19 and thereby form a half cloth.

A backing composite 12, 21 is provided underneath the half cloth. Backing composites impart flatness, dimensional stability, stiffness, and weight to the modular tile, and thereby minimize or eliminate the need for adhesives to secure the tile to a floor. A backing composite of a broadloom carpet normally consists of a latex coating (in addition to any latex precoat layer) and a textile substrate, such as a woven substrate. As compared to a broadloom carpet, the backing composite of a modular tile usually must be heavier to ensure performance and durability of the product, for example to enable heavy wear without deterioration. Thus, the backing composite of a carpet tile normally includes a polymeric coating or sheet, optionally with a glass veil or glass scrim embedded therein for dimensional stability and/or optionally with a lower substrate (often a fabric such as a nonwoven fleece) located on the underside of the tile.

FIG. 1 illustrates a carpet tile construction 10 having a backing composite 12 having a polymeric sheet 18 (which does not include an embedded fiberglass layer) and a fabric 24 on the underside of the tile construction. FIG. 2 illustrates a carpet tile construction 11 with a backing composite 21 having two polymeric sheets 18, 20 and a fiberglass layer 16 interposed between the backing sheets 18, 20. The carpet tile construction 11 does not include an underlying fabric as is the case with carpet tile construction 10.

The carbon footprint of a product is a measure of the total greenhouse gases (GHGs) that are removed from the atmosphere or emitted to the atmosphere during the product's life cycle (e.g., creation, use, and disposal). Also referred to as net Global Warming Potential (GWP) emissions, the carbon footprint is measured in kilograms of carbon dioxide ($CO_2$) equivalents per square meter (kg $CO_2$ eq/m$^2$). In determining GWP emissions, GHGs other than $CO_2$ are converted to $CO_2$ equivalents based on their radiative forcing effects over a period of one hundred years. A negative net GWP indicates that more GHGs are removed from the atmosphere than are emitted into the atmosphere during the life cycle of the product.

Net GWP emissions can be measured using a Life Cycle Assessment (also referred to as a Life Cycle Analysis), as described in the ISO 14000 series of environmental management standards. According to these standards, Life Cycle Assessment (LCA) is a technique to assess environmental impact of a product or service by quantifying all inputs and outputs of material flows and assessing how these material flows affect the environment. LCAs for products are conducted for the entire life cycle of a product; however, the life cycle of a product can be broken into stages. The stage from raw material through manufacturing is referred to as "cradle-to-gate," and the stage after sale, including customer use and end of life, is referred to as "gate-to-grave" (or "gate to end-of-life"). Where a product is recycled, the stage after sale can be referred to as gate to cradle.

Environmental Product Declarations (EPDs) are third party verified (certified) reports published by product manufacturers that provide information regarding environmental performance of their products. EPDs essentially report the results of LCAs performed on products. Specifically, an EPD for a product will report the GWP for each stage of the product's life cycle and the net GWP for the entire life cycle, as determined according to a published standard and a defined methodology. The LCA is conducted according to ISO 14040-ISO 14049 (second edition, Jul. 1, 2006 version), the entirety of which is herein incorporated by reference. These standards include, but are not limited to, ISO 14044: *Environmental management—Life cycle assessment—Requirements and guidelines* (first edition, Jul. 1, 2006 version), the entirety of which is herein incorporated by reference. The relevant standard for EPDs is ISO 14025: *Environmental labels and declarations—Type III environmental declarations—Principles and procedures* (first edition, Jul. 1, 2006 version), the entirety of which is herein incorporated by reference.

While the ISO standards do not include precise methodologies for carrying out LCA and calculating GWP, several accepted characterization factors exist, including CML-IA August 2006 *Characterisation Factor for Global Warming Potential*, used in Europe, and the *Tool for Reduction and Assessment of Chemicals and Other Environmental Impacts* ("TRACI"), developed by the US EPA.

TRACI provides a standard methodology for characterizing and calculating contributions to a product's GWP. While different accepted methodologies generally give the same or very similar results, for purposes of this application, any GWP reported herein is calculated (or estimated) using the methodology TRACI 2.1 Global Warming Potential including biogenic and Land Use Change (LUC). A negative GWP value indicates a negative carbon footprint.

Embodiments of the present invention are directed to improving the carbon footprint of products from "cradle-to-gate" (i.e., reducing the carbon footprint based on the production of the product). Thus, for purposes of this application, unless specifically stated otherwise, all references to carbon footprint or GWP refer to the cradle-to-gate global warming potential, with "cradle-to-gate" defined as in standard NEN-EN 15804:2012 *Sustainability of construction works—Environmental Product Declarations—Core rules for the product category of construction products*. Moreover, all references to carbon neutrality or carbon negativity, respectively, mean that the GWP is zero (carbon neutral) or negative (carbon negative) for the cradle-to-gate stage.

A cradle-to-gate LCA takes into account all inputs and outputs of GHGs from all aspects of a product's production, including raw material extraction, conversion of feed stocks into chemicals, transport of materials to factories, energy involved in fabricating the product, packaging, and production wastes and disposal. Thus, the type of materials as well as the amounts and weights of such materials used in a product all contribute to the carbon footprint of a product.

As one example, for a carpet tile, the type of yarn, size of yarn, fiber/yarn density, tufting primary material, tufting primary weight, and formulation and amount of precoat material all contribute to the carbon footprint of the half cloth. Moreover, the backing composite and each component thereof also contributes to the carbon footprint of the carpet tile. Commonly used backing compounds for forming backing composites on modular floor coverings, such as carpet tiles, are fossil fuel based, e.g., they comprise bitumen, polyvinyl chloride (PVC), or polyolefins, which are made from fossil fuels. Although fossil fuels are continually being formed via natural processes, they are generally considered to be non-renewable resources because they take millions of years to form and the known viable reserves are being depleted much faster than new ones are being made. The use of fossil fuels also raises potential environmental concerns, as their burning results in the formation of carbon dioxide, which is a notorious greenhouse gas.

There is a need for floor coverings that require lower quantities of fossil fuels and/or result in lower levels of greenhouse gas emissions. Additionally or alternatively, there is a need for floor coverings that utilize more bio-based materials and/or that are more environmentally sustainable, i.e., have a lower environmental impact and/or are more rapidly renewable. Additionally or alternatively, there is a need for partially or fully bio-based floor coverings that can be economically produced.

SUMMARY

Disclosed herein are surface coverings, such as floor coverings, that include one or more layers, such as an upper wear layer and a backing layer. The backing layer can be a backing composite that includes a backing compound and one or more substrates. In some embodiments, at least one of the layers in the product has been engineered to be carbon negative as measured by a Life Cycle Assessment. In some embodiments, the overall product is carbon negative as measured by a Life Cycle Assessment. In some embodiments, carbon negativity is achieved in part by inclusion in the product of a filler that includes concentrated carbon.

BRIEF DESCRIPTION OF THE DRAWINGS

A further understanding of the nature and advantages of various embodiments may be realized by reference to the following figures. In the appended figures, similar components or features may have the same reference labels.

DETAILED DESCRIPTION

Figure 1:
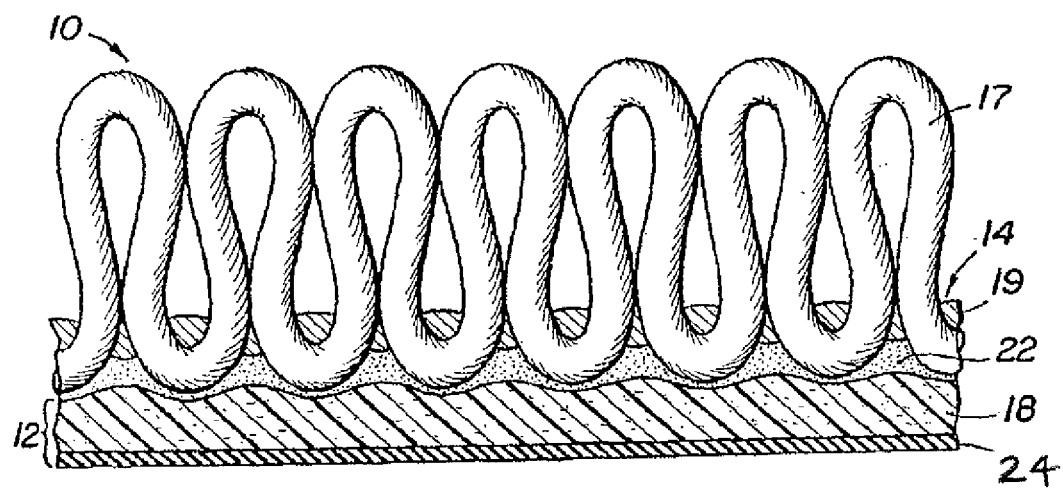
FIG. 1 is a cross-section of an embodiment of a prior art carpet tile construction that may be suitable for use with embodiments of the present invention.

Embodiments of the present invention relate to multi-layer surface coverings including floor coverings, such as, but not limited to, modular panels or tiles, for installation on interior surfaces. More specifically, embodiments of the invention relate to formulations for and modifications to various components of floor coverings that alone or collectively result in a product having a reduced, zero, and/or negative carbon footprint when subjected to a Life Cycle Assessment.

In some examples, the surface coverings described herein have a carbon footprint that is reduced through use of natural, bio-based, or recycled materials in place of conventional manmade materials. As used herein, "bio-based" refers to a naturally occurring organic material or a material intentionally made from substances derived from currently-existing organisms and/or organisms that lived in the Common Era (CE), as opposed to non-renewable fossil fuels that are made from prehistoric organisms.

Embodiments described herein overcome known compatibility problems when manmade materials are combined with natural, bio-based, and/or recycled materials. Such blends often result in heterogeneous formulations with inconsistent properties and a product that fails to meet desired performance specifications. In embodiments described herein, however, the surface coverings include one or more components, such as a precoat or backing compound, formed in whole or in part from a substantially homogenous mixture of manmade materials and natural, bio-based, and/or recycled materials. In other examples, one or more other components of the surface covering includes a natural, bio-based, or recycled material. In still other examples, precision manufacturing allows an overall reduction in materials that reduces the product's carbon footprint without a reduction in performance.

Embodiments described herein provide surface coverings that are carbon neutral or carbon negative. It should be noted that not every layer or component in the product need be carbon neutral or carbon negative. Rather, the products are engineered such that the overall product can have a net neutral and, even better, net negative carbon footprint. To accomplish this, various layers may be engineered to be carbon negative and compensate for other layers in the product being carbon positive. For example, the backing layer may be carbon negative to offset a half cloth having a positive carbon footprint. Alternatively, the half cloth of a carpet tile could be carbon negative to offset a backing layer having a positive carbon footprint. Yet still, each layer of the product, in isolation, could be carbon neutral or carbon negative.

Embodiments described herein include coating compounds (e.g. precoat compounds and backing compounds) that include a high purity biochar, referred to herein as concentrated carbon.

As used herein, "biochar" refers to the solid material produced by pyrolysis (i.e., direct thermal decomposition) of biomass in the absence of oxygen. Pyrolysis of biomass produces a mixture of solids (biochar), liquids (biooil), and gas (biogas). Biomass includes any organic material that comes from plants or animals, for example, wood and wood processing waste, agricultural crops and waste materials, yard waste, and animal waste. Biochar can be produced with pyrolysis temperatures of at least 350° C., optionally at least 400° C., at least 600° C., at least 800° C., from 350° C. to 1000° C., inclusive; from 400° C. to 1000° C., inclusive; from 600° C. to 1000° C.; inclusive, from 800° C. to 1000° C., inclusive.

As used herein, "concentrated carbon" refers to a biochar, as defined herein, having a carbon content of at least 80% by weight. As used herein, the "carbon content" refers to the percentage of the biochar mass that is atomic carbon.

In some examples, the concentrated carbon is an engineered material, intentionally created under prescribed controlled conditions proven to reliably produce a substance with predefined specific characteristics in terms of composition and manufacturing processing ability. In some examples, the concentrated carbon is formed when woody waste and/or other rapidly renewable plant and shell materials are exposed to high heat under low oxygen conditions in a process driven by renewable gas energy and the synthesis gas created during heating. This process creates a carbon rich, lightweight blendable material that locks away carbon that would otherwise escape into the atmosphere.

The concentrated carbon described herein can be formed by pyrolysis of a biomass in an oxygen-limited environment at very high temperatures. The weight percent of carbon and the concentration of impurities in the concentrated carbon are affected by several factors, including the type of biomass, the carbon content of the biomass, and the pyrolysis conditions.

Useful sources of biomass for producing the concentrated carbon described herein include any sustainable, rapidly-renewable material with minimal heavy metal content. In some examples, useful sources of biomass include grass, algae, other microbial mass, leaves, bark material, beans, hulls, mangroves, wood wastes, and nut shells. In other examples, useful sources of biomass include agricultural and municipal waste. In some examples, the feedstock biomass for pyrolysis has at least 50%, at least 60%, or at least 70% (w/w) carbon content. In some examples, the pyrolysis temperature is at least 350° C., at least 400° C., at least 600° C., at least 800° C., from 350° C. to 1000° C., inclusive; from 400° C. to 1000° C., inclusive; from 600° C. to 1000° C., inclusive; or from 800° C. to 1000° C., inclusive. Generally, a higher pyrolysis temperature reduces the amount of volatile impurities in the final product, providing a more pure concentrated carbon. Optionally, the pyrolysis process may be fuelled by combustion of syngas generated during the process or by supplemental renewable energy. In some examples, the pyrolysis modifies the chemical bonds of the biomass and creates graphene complexes, which are present in the concentrated carbon.

The concentrated carbon described herein has a molar $H/C_{org}$ ratio of less than 0.7, optionally less than 0.65, less than 0.60, less than 0.55, less than 0.50, or less than 0.45. The concentrated carbon described herein has a molar $O/C_{org}$ ratio of less than 0.4, less than 0.35, less than 0.3, less than 0.35, or less than 0.2. 40%, at least 50%, at least 60%, or at least 70%. Optionally, the concentrated carbon described herein has a pH from about 6.5 to about 10.5, inclusive; from about 7 to about 10.5, inclusive; from about 8 to about 10, inclusive; from about 9 to about 10, inclusive.

The surface coverings described herein can be floor coverings that will typically (but not always) include an upper wear layer and a backing layer, where the backing layer can be a backing composite including a backing compound and at least one substrate.

Upper Wear Layer

Figure 2:
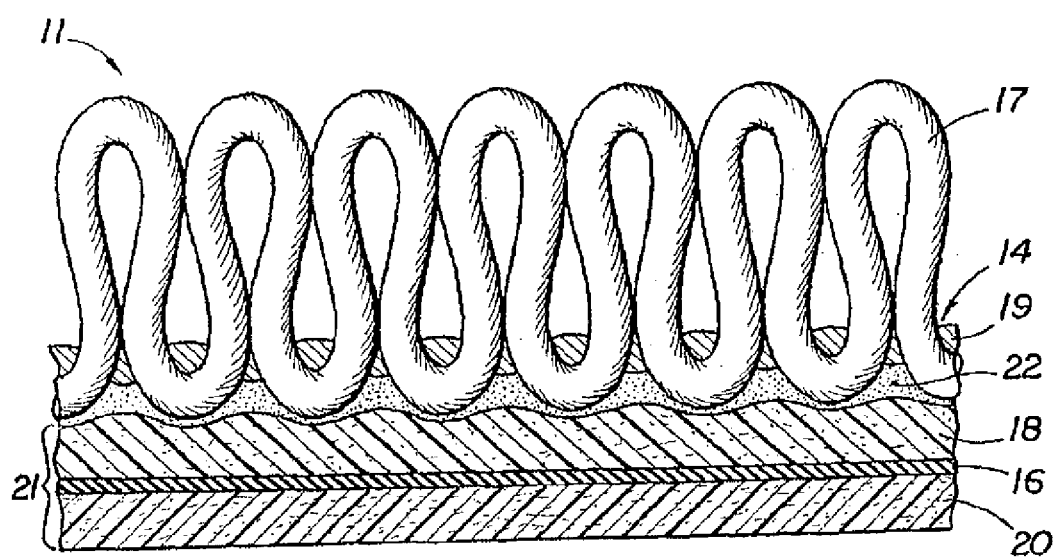
FIG. 2 is a cross-section of an alternative embodiment of a prior art carpet tile construction that may be suitable for use with embodiments of the present invention.

The upper wear layer of the floor covering can include any conventional or specialty material used in floor coverings. Materials for the upper wear layer may be selected so that the resulting floor coverings exhibit desired properties, such as, but not limited to, a decorative appearance, favorable acoustic attributes, good insulation (e.g., good R values), water resistance, flame resistance, etc. In some examples, a floor covering described herein is a sheet or tile, including but not limited to a performance broadloom carpet or carpet tile, a luxury vinyl sheet or tile, or a rubber sheet or tile. While embodiments of the invention are described with specific reference to carpet tiles (such as, but not limited to, those having the constructions shown in FIGS. 1 and 2), it should be understood that a person skilled in the art could implement or adapt the disclosure set forth herein in other types of surface coverings and applications as appropriate and applicable.

Some embodiments of the present invention include selecting or altering the types of materials and/or the amounts of materials used in the upper wear layer (e.g., the half cloth in carpet tiles), to reduce the carbon footprint of the upper wear layer and the carbon footprint of the overall tile. For example, in carpet tiles, the size of the yarns, tuft height of the yarn, and stitch density (e.g., number of yarn tufts per square inch) all impact the face weight of the yarn, which impacts the carbon footprint of the half cloth. "Face weight" refers to the weight of the yarn used in the half cloth. Each of the yarn size, tuft height, and stitch density can be manipulated to adjust the carbon footprint of the half cloth.

More specifically, it has been found that yarns of smaller size may be used without sacrificing the aesthetics of the tufted product. Rather, smaller-sized yarns may be tufted to a lower tuft height but at a higher tuft or stitch density (i.e., more tufts per square inch). This results in use of less yarn overall so as to have a lower face weight of the yarn without sacrificing aesthetics. Moreover, the use of smaller yarns allows for placement of more tufts within an area, enabling the creation of more intricate and precise tufted patterns. The higher density of tufts also prevents the tufting primary from being visible (a problem known as grinning), despite the tufts being of shorter height.

Yarn Size:

Some embodiments of the present invention use yarns having a denier of less than 2000, such as, but not limited to, a denier of from 800 to 1800, inclusive; from 900 to 1600, inclusive; from 1000 to 1500, inclusive; from 1000 to 1400, inclusive; from 1000 to 1200, inclusive and/or from 1200 to 1800, inclusive. In some embodiments, the yarn has a denier of 1200. The yarns may be single- or multi-ply. By way only of example, a 1200 denier yarn end may be formed by a single 1200 denier yarn, by 2 plies of 600 denier yarn, by 3 plies of 400 denier yarn, etc.

Tuft Height:

Some embodiments of the half cloths disclosed herein include yarn tufts having a tuft height of from 1/32 inch to 5/32 inch (0.794 mm to 4.76 mm), inclusive; from 2/32 inch to 5/32 inch 1.59 mm to 3.97 mm), inclusive; from 2/32 inch to 4/32 inch (1.59 mm to 3.175 mm), inclusive; and/or from 2/32 inch to 3/32 inch (1.59 mm to 2.38 mm), inclusive. The half cloth may be tufted using any tufting machine, although 10th and 12th gauge machines (such as those available from Tuftco Corporation and Card Monroe Corporation, both of Chattanooga, Tenn.) may be particularly suitable.

Tuft Density:

Some embodiments of the half cloths disclosed herein include yarn tufts having a tuft density of from 100 to 400 tufts per square inch ("TPI"), inclusive; from 110 to 400 TPI, inclusive; from 140 to 300 TPI, inclusive; from 160 to 280 TPI, inclusive; from 170 to 270 TPI, inclusive; from 170 to 260 TPI, inclusive; from 180 to 250 TPI, inclusive; and/or from 180 to 240 TPI, inclusive.

Face Weight:

The face weight of the yarn in half cloths of traditional carpet tiles is at least 20 ounces per square yard ("osy"). The face weight of the yarn in some embodiments of the half cloths described herein is significantly lower, such as in the range of from 5 to 20 osy, inclusive; from 6 to 18 osy, inclusive; from 8 to 17 osy, inclusive; from 10 to 15 osy, inclusive; from 6 to 12 osy, inclusive; from 12-18 osy, inclusive; and/or from 9 to 12 osy, inclusive. In some embodiments, the face weight of the yarn is approximately 5 osy, 6 osy, 7 osy, 8 osy, 9 osy, 10 osy, 11 osy, 12 osy, 13 osy, 14 osy, 15 osy, 16 osy, 17 osy, 18 osy, 19 osy, or 20 osy.

Yarn Material:

The material from which the yarn is made can be selected to contribute to a reduced carbon footprint. For example, yarn made from natural, bio-based, or recycled material would provide a lower contribution to the half cloth GWP than yarn made from non-renewable, fossil fuel-based resources. The yarn may be made from any type of fiber material, including, but not limited to, nylon (nylon 6 or nylon 6,6), polyester, polypropylene, PET (polyethylene terephthalate), PTT (polytrimethyl terephthalate), PBT (polybutyl terephthalate), PLA (polylactic acid), hemp, wool, cellulosics, and other fibers. In some examples, the yarn is a post-consumer ("PC") or a post-industrial ("PI") recycled material, such as a PC or PI recycled nylon or a PC or PI polyethylene terephthalate. Other suitable yarn materials are disclosed in WO 2011/066620, the entirety of which is incorporated herein by reference.

Tufting Primary:

The tufting primary can be any woven or nonwoven material, including but not limited to, polypropylene, polyester, recycled polyester, polylactic acid, nylon, and jute. Traditional tufting primaries typically weigh 3-4 osy.

All of the above factors may be selected and manipulated so as to reduce, and even render neutral or negative, the carbon footprint of the face cloth. Table 1 compares constructions of a conventional face cloth and embodiments of inventive face cloths contemplated herein with the associated carbon footprint of each based on the materials.

TABLE 1

| | Face Cloth Construction | | | |
|---|---|---|---|---|
| | Conventional Face Cloth | Inventive Face Cloth ("FC") | | |
| | | FC I | FC II | FC III |
| Yarn type | nylon 6, 6 | recycled nylon 6 | recycled nylon 6 | recycled nylon 6 |
| Yarn size (denier) | 2400-2700 | 900-1200 | 1200-1800 | 1200-1800 |
| Tuft height (in) | 4/32-7/32 | 2/32-3/32 | 2/32-3/32 | 2/32-4/32 |
| Tuft density (TPI) | 100 | 108 | 216 | 400 |
| Yarn face weight (osy) | 20 | 6 | 12 | 18 |
| Tufting primary | Nonwoven Polyester | Nonwoven Polyester | Nonwoven Polyester | Nonwoven Polyester |
| Tufting Primary weight (osy) | 4 | 4 | 4 | 4 |
| TRACI 2.1* GWP (kg $CO_2$ eq/$m^2$) | 2.8-3.1 | 0.8-0.9 | 1.2-1.5 | 1.7-2.2 |

*based only on the material in the face cloth; not a cradle-to-gate life cycle assessment of the face cloth (i.e., estimate does not include transport of materials to factories, energy involved in fabricating the product, packaging, and production wastes and disposal).

Moreover, the reduction in the carbon footprint of the half cloth is achieved without sacrificing performance. More specifically, it has been surprisingly discovered that carpet tiles that include embodiments of the half cloths disclosed herein are able to achieve the severe wear rating (i.e., a rating of equal to or greater than 3.5) pursuant to the rating scales set forth in ASTM D7330-2015: Standard Test Method for Assessment of Surface Appearance Change in Pile Floor Coverings Using Standard Reference Scales (2015 version), the entirety of which is herein incorporated by reference, and when the tile is subjected to the test method set forth in ASTM D5252-2015: Standard Practice for the Operation of the Hexapod Tumble Drum Tester (2015 version), the entirety of which is herein incorporated by reference.

To test for wear pursuant to ASTM D5252, a piece of finished carpet tile is cut to fit within and around the circumference of a drum that is mounted on a rotary device. A pod onto which are positioned six feet of a specified weight is positioned within the drum. In this, the pod is a mechanical foot simulator. The drum is rotated via the rotary device for a specified number of revolutions, after which the piece of carpet tile is laid out and the overall appearance of the carpet tile is inspected and rated. ASTM D7330 sets forth rating scales for indicating how well the carpet "held up" under testing, and the inspector is to consider factors such as pile crush, pilling, broken ends, etc. in rating the carpet. More specifically, ASTM D7330 includes a Texture Appearance Retention Rating (TARR) for rating changes in the tile appearance. A TARR rating of 5 represents no change in the appearance of the half cloth after testing, and a TARR rating of 1 indicates a very severe change in the appearance of the half cloth after testing. Some embodiments of carpet tiles having half cloths disclosed herein achieve a TARR rating pursuant to ASTM D7330 of greater than or equal to 2.5, greater than or equal to 3.0, and/or greater than or equal to 3.5 when tested in accordance with ASTM D7330. A TARR rating of greater than or equal to 3.5 indicates that the tile is suitable for use under the most severe traffic conditions.

Carpet tiles that include embodiments of the half cloths disclosed herein may also satisfy the requirements for a Class 33: Heavy Commercial Use classification specified in BS EN 1307:2014—Textile Floor Coverings—Classification (the entirety of which is herein incorporated by reference) when the tile is subjected to the Vetterman Drum test method set forth in BS ISO 10361:2015—Textile floor coverings—Production of changes in appearance by means of Vettermann drum and hexapod tumbler tester (the entirety of which is herein incorporated by reference) and its performance rated pursuant to BS EN ISO 9405:2017—Textile Floor coverings—Assessment of Changes in Appearance (the entirety of which is herein incorporated by reference).

Precoat layer: In a carpet tile, a precoat layer is used to secure the yarn to the tufting primary layer. Generally, the precoat is applied as a water-based emulsion of a precoat adhesive that optionally is modified with fillers and various additives. In some examples, the carbon footprint of the precoat layer is manipulated and reduced by selection of materials used as the precoat adhesive, the filler, and/or the various additives.

Suitable precoat adhesives include, but are not limited to, any thermoplastic polymer, including hot melt, latex, ethylene vinyl acetate (EVA), acrylic, a bituminous compound, a rubber compound, or any combination of these materials. In some examples, the precoat adhesive includes a thermoplastic derived from a natural or recycled material, including but not limited to a starch or recycled polyvinyl butyral.

Precoat compositions contemplated for the floor coverings described herein include a precoat adhesive in a weight percent of from about 15% to about 100% by weight ("w/w"), inclusive; from about 20% to about 100% (w/w), inclusive; from about 30% to about 100% (w/w), inclusive; from about 40% to about 100% (w/w), inclusive; from about 50% to about 100% (w/w), inclusive; from about 15% to about 90% (w/w), inclusive; from about 20% to about 90% (w/w), inclusive; from about 30% to about 90% (w/w), inclusive; from about 40% to about 90% (w/w), inclusive; from about 50% to about 90% (w/w), inclusive; from about 90% to about 100% (w/w), inclusive; from about 90% to about 98% (w/w), inclusive; from about 15% to about 90% (w/w), inclusive; from about 20% to about 90% (w/w), inclusive; from about 30% to about 90% (w/w), inclusive; from about 40% to about 90% (w/w), inclusive; from about 50% to about 90%, inclusive; from about 15% to about 80% (w/w), inclusive; from about 20% to about 80% (w/w), inclusive; from about 30% to about 80% (w/w), inclusive; from about 40% to about 80% (w/w), inclusive; from about 50% to about 80% (w/w), inclusive; from about 15% to about 70% (w/w), inclusive; from about 20% to about 70% (w/w), inclusive; from about 30% to about 70% (w/w), inclusive; from about 40% to about 70% (w/w), inclusive; from about 50% to about 70% (w/w), inclusive; from about 15% to about 60% (w/w), inclusive; from about 20% to about 60% (w/w), inclusive; from about 30% to about 60% (w/w), inclusive; from about 40% to about 60% (w/w), inclusive; from about 50% to about 60% (w/w), inclusive; from about 15% to about 50% (w/w), inclusive; from about 20% to about 50% (w/w), inclusive; from about 30% to about 50% (w/w), inclusive; or from about 40% to about 50% (w/w), inclusive.

Fillers have often been incorporated into the precoat adhesive to add stiffness and weight, to modify flow properties, to improve tuft binding, to impart desirable properties such as flame resistance, and for economic benefits. Suitable fillers for the precoat include any known organic or inorganic (e.g. mineral) filler material. In some examples, the precoat filler includes a natural, bio-based, or recycled filler material that can contribute to a reduced carbon footprint of the precoat and, ultimately, the floor covering. Additionally or alternatively, the precoat filler can include a conventional filler material. Useful precoat filler materials include fly ash; calcium oxide; calcium carbonate (e.g., limestone); silicates; silicas; oxides of silica; carbonates; sulfates; oxides of antimony; aluminium trihydrate; carbon black; talcum; clays; kaolin; wood (e.g., wood chips and wood flour); sea shell (e.g., shell flour); plant material (e.g., plant fibers, plant shells, and plant residues); remined, post-industrial, or recycled organic or inorganic materials (e.g., calcium carbonate, talc, clays, minerals, rubber, plastic, or fibers), and biochar. In some embodiments the filler includes a high purity biochar, referred to herein as concentrated carbon.

Precoat compositions contemplated for the floor coverings described herein include filler in a weight percent of from about 0% to about 85% (w/w), inclusive; from about 0% to about 80% (w/w), inclusive; from about 0% to about 70% (w/w), inclusive; from about 0% to about 60% (w/w), inclusive; from about 0% to about 50% (w/w), inclusive; from about 10% to about 85% (w/w), inclusive; from about 10% to about 80% (w/w), inclusive; from about 10% to about 70% (w/w), inclusive; from about 10% to about 60% (w/w), inclusive; from about 10% to about 50% (w/w), inclusive; from about 0% to about 10% (w/w), inclusive; from about 2% to about 10% (w/w), inclusive; from about 20% to about 85% (w/w), inclusive; from about 20% to about 80% (w/w), inclusive; from about 20% to about 70% (w/w), inclusive; from about 20% to about 60% (w/w), inclusive; from about 20% to about 50% (w/w), inclusive; from about 30% to about 85% (w/w), inclusive; from about 30% to about 80% (w/w), inclusive; from about 30% to about 70% (w/w), inclusive; from about 30% to about 60% (w/w), inclusive; from about 30% to about 50% (w/w), inclusive; from about 40% to about 85% (w/w), inclusive; from about 40% to about 80% (w/w), inclusive; from about 40% to about 70% (w/w), inclusive; from about 40% to about 60% (w/w), inclusive; from about 40% to about 50% (w/w), inclusive; from about 50% to about 85% (w/w), inclusive; from about 50% to about 80% (w/w), inclusive; from about 50% to about 70% (w/w), inclusive; or from about 50% to about 60% (w/w), inclusive. In some embodiments, the precoat composition does not include filler.

Precoat formulations can also include various processing aids and additives, such as, but not limited to, antistats, antimicrobial, anti-dust mite, and flame retardants. Suitable bio-based additives include, but are not limited to, lecithin and permethrin.

Conventional precoats rely on a high mass of precoat material to encapsulate and secure the yarn. Embodiments described herein use reduced mass of precoat material to reduce the carbon footprint of the precoat and the resulting contribution of the precoat to the carbon footprint of the floor covering. In some examples, the mass of the precoat is reduced by reducing the amount of filler added to the precoat adhesive. In some embodiments, the precoat adhesive is devoid of any fillers. Reducing or eliminating the filler also results in a more concentrated adhesive such that less is needed in the application. In some examples, precision application of the precoat to the tufting primary allows further reduction of precoat mass while maintaining performance. For example, conventional precoats have weights from about 18 osy to about 32 osy, but in some examples described herein the amount of precoat used is reduced to from about 5 osy to about 20 osy, inclusive; from about 7 osy to about 18 osy, inclusive; from about 7 osy to about 12 osy, inclusive; or from about 12 osy to about 18 osy, inclusive. In some embodiments, the amount of precoat used is reduced to less than 20 osy, 18 osy, 16 osy, 14 osy, 12 osy, 10 osy, and 8 osy.

Table 2 compares an example of a conventional precoat composition against examples of embodiments of inventive precoat compositions ("PC") contemplated herein.

TABLE 2

Precoat Compositions

|  | Conventional Precoat Composition | PC I | PC II |
|---|---|---|---|
| Adhesive | 19% | 49.5% | 21.6% |
| Filler | 80% | 49.5% | 76% |
| Additive | 1.0% | 1.0% | 2.4% |

Typical carpet tile half cloths weigh approximately 50 osy (20 osy of yarn, 4 osy tufting primary, and 26 osy precoat). Implementation of some or all of the modifications proposed above can significantly reduce the weight of the half cloth. In some embodiments, the half cloth (yarn, tufting primary, and precoat) weighs from 14 osy to 35 osy, inclusive; from 14 osy to 30 osy, inclusive; from 14 osy to 25 osy, inclusive; from 14 osy to 23 osy, inclusive; from 14 osy to 21 osy, inclusive; from 15 osy to 19 osy, inclusive; or from 16 osy to 18 osy, inclusive.

Table 3 compares constructions of a conventional half cloth and embodiments of inventive half cloths contemplated herein.

TABLE 3

Half Cloth Construction

|  | Conventional Half Cloth | Inventive Half Cloth | | |
|---|---|---|---|---|
|  |  | HC I | HC II | HC III |
| Face cloth | Conventional face cloth (Table 1) | FC I (Table 1) | FC II (Table 1) | FC III (Table 1) |
| Precoat | Conventional Precoat (Table 2) | PC I (Table 2) | PC II (Table 2) | PC I (Table 2) |
| Precoat weight (osy) | 26 | 7 | 7 | 13 |
| Total Half Cloth weight (osy) | 50 | 17 | 23 | 35 |
| TRACI 2.1 GWP* (kg $CO_2$ eq/$m^2$) | 3.5-43 | 1.1-1.2 | 1.4-1.5 | 2.0-2.4 |

*based only on the material in the half cloth, not a cradle-to-gate life cycle assessment of the half cloth (i.e., estimate does not include transport of materials to factories, energy involved in fabricating the product, packaging, and production wastes and disposal).

As reflected in Table 3, some embodiments of the inventive half cloth represent at least a 65% weight reduction; at least a 50% weight reduction; at least a 40% weight reduction; at least a 30% weight reduction; at least a 25% weight reduction; or at least a 20% weight reduction over conventional half cloth weights. In some embodiments, the reduction in the carbon footprint of embodiments of the half cloths contemplated herein as compared to the Conventional Half Cloth above is at least −1 KG $CO_2/m^2$, at least −1.2 KG $CO_2/m^2$, at least −1.4 KG $CO_2/m^2$, at least −1.6 KG $CO_2/m^2$, at least −1.8 KG $CO_2/m^2$, at least −2.0 KG $CO_2/m^2$, at least −2.2 KG $CO_2/m^2$, at least −2.4 KG $CO_2/m^2$, at least −2.6 KG $CO_2/m^2$, at least −2.8 KG $CO_2/m^2$, or at least −3.0 KG $CO_2/m^2$.

Backing Layer

In addition to the upper wear layer, the floor covering described herein will typically include a backing layer beneath the upper wear layer. The backing layer typically is a backing composite that includes a backing compound and one or more optional substrates. Embodiments of the floor coverings described herein have backing compounds that include a binder and a filler. The filler includes a high purity biochar, referred to herein as concentrated carbon. Including concentrated carbon as a filler in the backing compound dramatically reduces the carbon footprint of the floor covering by sequestering carbon. The effect of using concentrated carbon on the carbon footprint can be even more dramatic for floor coverings with high filler content. For example, in modular flooring, such as carpet tile, the backing composite must be rigid so the tile can function as a free-lay flooring tile. Generally, the backing composite of modular flooring has a high filler content to contribute to the required dimensional stability.

In addition to being dimensionally stable, the backing compounds and optionally the backing composites described herein are flexible. Flexibility facilitates installation of the floor coverings described herein. A flexible backing compound or backing composite described herein easily yields to bending without breaking. The force required to bend the flexible backing compound or backing composite described herein is low, and as one example, sufficient force can be applied by a person without use of machinery, such as when the surface covering is being installed.

Filler:

The backing compound of the floor covering described herein includes a filler that includes concentrated carbon, a high purity biochar that has a carbon content of at least 80% by weight, as defined above. In some examples, the concentrated carbon has a carbon content of at least 85%, at least 90%, at least 95%, or at least 99%. Some biochar includes polycyclic aromatic hydrocarbons ("PAH"s) (e.g., naphthalene) and heavy metals (e.g., mercury, cadmium, lead, chromium, and arsenic) as impurities. In some embodiments, the concentrated carbon described herein includes less than 60 parts-per-million ("ppm") of PAHs and/or less than 25 ppm of heavy metals. For example, any concentrated carbon described herein can include PAHs in a concentration of less than 60 ppm, less than 50 ppm, less than 40 ppm, or less than 30 ppm. In some examples, the concentrated carbon includes less than 7 ppm, less than 5 ppm, or less than 3 ppm of any individual PAH. As a further example, any concentrated carbon described herein can include heavy metals in a concentration of less than 25 ppm, less than 20 ppm, less than 15 ppm, less than 10 ppm, or less than 5 ppm. In some examples, the concentrated carbon includes less than 3 ppm, less than 2 ppm, or less than 1 ppm of mercury or cadmium. In some examples, the concentrated carbon includes less than 15 ppm, less than 12 ppm, or less than 10 ppm of lead, chromium, or arsenic.

Any concentrated carbon described herein is suitable for use in the backing compounds described herein. Optionally, the concentrated carbon is produced by pyrolysis of a feedstock biomass having a carbon content of at least 50%, at least 60%, or at least 70% (w/w). Optionally, the concentrated carbon is produced by a pyrolysis process carried out at a temperature of at least 350° C., at least 400° C., at least 600° C., at least 800° C., from 350° C. to 1000° C., inclusive; from 400° C. to 1000° C., inclusive; from 600° C. to 1000° C., inclusive; or from 800° C. to 1000° C., inclusive.

The concentrated carbon in the backing compound can be in the form of particles that have a particle size from about 0.01 μm to about 3 mm, inclusive; from about 0.01 μm to about 2.5 mm, inclusive; from about 0.01 μm to about 2 mm, inclusive; from about 0.01 μm to about 1 mm, inclusive. In some embodiments, the mean particle size of the concentrated carbon particles can be from about 80 μm to about 120 μm, inclusive. The particles may be segregated or classified to produce a desired mean size. When the concentrated carbon raw material is introduced into a backing compound it may have a particle size larger than about 3 mm. Generally, the concentrated carbon particles are reduced in size during production of the backing compound.

The filler content in the backing compounds described herein can be 100% concentrated carbon, but typically includes from about 0.1% to about 100% (w/w), inclusive, concentrated carbon. In some examples, the filler content includes concentrated carbon in at least 2% (w/w), at least 10% (w/w), at least 15% (w/w), at least 20% (w/w), at least 25% (w/w), at least 30% (w/w), at least 35% (w/w), at least 40% (w/w), at least 45% (w/w), at least 50% (w/w), at least 55% (w/w), at least 60% (w/w), at least 65% (w/w), at least 70% (w/w), at least 75% (w/w), at least 80% (w/w), at least 95% (w/w), at least 90% (w/w), at least 95% (w/w). In some examples, the filler content includes concentrated carbon in any weight percent of from about 2% to about 98% (w/w), inclusive; from about 10% to about 70% (w/w), inclusive; from about 20% to about 55% (w/w), inclusive; or from about 30% to about 50% (w/w), inclusive. Where the filler content is less than 100% concentrated carbon, the filler also includes one or more additional filler materials.

The additional filler material(s), when present, can be any known organic or inorganic (e.g. mineral) filler material. In some examples, the additional filler material is a natural, bio-based, or recycled filler material that independently can contribute to a reduced carbon footprint of the backing compound and the floor covering. In other examples, however, the additional filler material can be a conventional filler material. Useful inorganic filler materials include fly ash; calcium oxide; calcium carbonate (e.g., limestone); silicates; silicas; oxides of silica; carbonates; sulfates; oxides of antimony; aluminium trihydrate; carbon black; talcum; clays; kaolin; and remined, post-industrial, or recycled forms thereof. Optionally, the additional filler is recycled limestone. Useful organic filler materials include wood (e.g., wood chips and wood flour); sea shells (e.g., shell flour); plant material (e.g., plant fibers, plant shells, and plant residues); and remined, post-industrial, or recycled forms thereof. Optionally, the additional filler is a recycled material (e.g., recycled rubber, recycled plastic, or recycled fibers).

The filler (including the concentrated carbon and any additional filler material(s)) can have a particle size from about 0.01 μm to about 1 mm, and the filler particles may be segregated or classified to produce a desired mean size. In some examples, a filler having these particle sizes can be combined with one or more other differently shaped fillers. Optionally, inorganic fillers can be combined with bio-based fillers and/or recycled fillers like wood chips, natural fibers, plant shells, plant residues, synthetic fibers, glass fibers, recycled fibers, recycled rubber, recycled plastic, recycled minerals, and other recycled materials. Any combination of additional fillers that would provide desired properties can be combined with the concentrated carbon disclosed herein for incorporation into the backing compound disclosed herein.

The backing compound includes the filler, including concentrated carbon and any additional filler material, in any desirable amount. In some examples, the backing compounds described herein include filler in a weight percent from about 30% to about 95% (w/w), inclusive; from about 40% to about 95% (w/w), inclusive; from about 50% to about 95% (w/w), inclusive; from about 60% to about 94% (w/w), inclusive; from about 70% to about 92% (w/w), inclusive; from about 75% to about 90% (w/w), inclusive; from about 75% to about 88% (w/w), inclusive; or from about 77% to about 86% (w/w), inclusive; from about 40% to about 70% (w/w), inclusive; from about 45% to about 70% (w/w), inclusive; from about 45% to about 65% (w/w), inclusive; and from about 50% to about 65%, inclusive.

In some embodiments, the backing compounds described herein include concentrated carbon in weight percents of from about 0.1% to about 70% (w/w), inclusive; from about 0.5% to about 65% (w/w), inclusive; from about 1% to about 65% (w/w), inclusive; from about 1% to about 60% (w/w), inclusive; from about 10% to about 60% (w/w), inclusive; from about 10% to about 55% (w/w), inclusive; from about 10% to about 50% (w/w), inclusive; from about 15% to about 60% (w/w), inclusive; from about 20% to about 60% (w/w), inclusive; from about 20% to about 50% (w/w), inclusive; from about 25% to about 55% (w/w), inclusive; from about 30% to about 50% (w/w), inclusive; from about 1% to about 15% (w/w), inclusive; from about 1% to about 10% (w/w), inclusive; from about 1% to about 5% (w/w), inclusive; from about 5% to about 15% (w/w), inclusive; from about 5% to about 10% (w/w), inclusive; from about 10% to about 15% (w/w), inclusive; from about 15% to about 50% (w/w), inclusive; from about 15% to about 40% (w/w), inclusive; from about 20% to about 40% (w/w), inclusive; from about 25% to about 35% (w/w), inclusive; or from about 30% to 40% (w/w), inclusive.

Binder:

In addition to the filler, the backing compounds described herein further include a binder that imparts structure to the backing system. The binder includes at least one of bio-based ester, a bio-based oil, or a polymer and may optionally include additives that facilitate production of the backing compound or that impart desirable properties to the finished backing compound. In some embodiments, the binder includes one or more bio-based esters, one or more bio-based oils, and one or more polymers, but in other embodiments the binder does not include all three components.

The binder can be present in the backing compounds described herein in a weight percent from about 5% to about 70% (w/w), inclusive; from about 5% to about 60% (w/w), inclusive; from about 5% to about 50% (w/w), inclusive; from about 6% to about 40% (w/w), inclusive; from about 8% to about 30% (w/w), inclusive; from about 10% to about 25% (w/w), inclusive; from about 12% to about 25% (w/w), inclusive; or from about 14% to about 23% (w/w), inclusive. In some examples, the binder portion of the backing compound comprises at least about 40% (w/w) bio-based and/or recycled materials, For example, the binder content can include at least about 50%, at least about 60%, at least about 70%, at least about 80%, at least about 85%, at least about 90%, or at least about 95% (w/w) bio-based and/or recycled materials, or the binder content can be 100% bio-based or recycled material.

Bio-based esters useful in the backing compound are normally in solid form at room temperature. They can have a melting point between about 65° C. and about 160° C. (for example, between about 80° C. and 120° C.) to allow them to be handled at room temperature while allowing the mixing and application processes to be carried out at reasonable processing temperatures.

The bio-based esters used in the backing compounds described herein can be a rosin or a rosin derivative. Rosin is a natural resin obtained from pines and other plants, such as conifers. Rosin is semi-transparent and varies in color from yellow to black. Rosin primarily consists of various resin acids. Rosin used in the backing compounds can be unmodified or modified (i.e., a rosin derivative). Modified rosins useful in the backing compounds described herein include esterified rosin, hydrogenated rosin, dimerized rosin, phenolic rosin, terpenic rosin, and the like. As an example, suitable esterified rosins may be reaction products of rosin with mono-, di-, tri-, tetra-, or polyfunctional alcohols or combinations thereof, including methyl alcohol, dipropylene glycol, glycerol, pentaerythritol, and combinations thereof. The rosin or rosin derivative used in the present invention may be, or may be derived from, any of the commercially available types of rosin such as wood rosin, gum rosin, tall oil rosin and mixtures thereof in their crude or refined state.

The bio-based ester can be present in the backing compounds described herein in a weight percent from about 0% to about 50% (w/w), inclusive (e.g., from about 5% to about 50%, inclusive; from about 5% to about 40%, inclusive; from about 7% to about 35%, inclusive; from about 8% to about 32%, inclusive; from about 9% to about 30%, inclusive; from about 10% to about 40%, inclusive; from about 11% to about 25%, inclusive; from about 12% to about 20%, inclusive; from about 12% to about 20%, inclusive; from about 15% to about 40%, inclusive; from about 20% to about 40%, inclusive; or from about 20% to about 40%, inclusive).

The oil in the backing compound can act as a plasticizer to soften the backing compound and make it more flexible. By including oil in the binder, the filler load of the backing compound can be increased, allowing more concentrated carbon to be included in the backing compound. Including oil in the binder can also reduce or eliminate the need for polymers. This combination of increasing the amount of filler and decreasing the amount of polymer in the binder is highly beneficial because most fillers have a relatively low environmental impact, while polymers have a relatively high environmental impact. Thus, both increasing the amount of filler and decreasing the amount of polymer decrease the environmental impact of the binder.

Oils useful in the backing compound can be natural or synthetic. In some examples, the oil is a natural oil, such as a vegetable oil. In some examples, the oil is vegetable oil, soybean oil, rapeseed oil, refined rapeseed oil, sunflower oil, refined sunflower oil, high oleic sunflower oil, palm oil, castor oil, and/or coconut oil. Optionally, the oil is refined or modified, such as hydrogenated or partially hydrogenated vegetable oil. In other examples, the oil is an epoxidized soybean oil ("ESO") or a reacted ESO. In some examples, the natural oil need not be limited to vegetable oil, and can be a non-fossil oil, such as a plant, animal, or algae-derived oil. In some embodiments, the oil can be a synthetic oil, such as an oil that has been synthesized to give desired properties.

The backing compounds described herein can include oil in a weight percent from about 0% to about 20% (w/w), inclusive (e.g., from about 1% to 15%, inclusive; from about 2% to 15%, inclusive; from about 2% to 10%, inclusive; from about 1% to 5%, inclusive; from about 5% to 15%, inclusive; from about 5% to 10%, inclusive; from about 0.1% to about 20%, inclusive; from about 0.1% to about 15%, inclusive; from about 0.25% to about 11%, inclusive; from about 0.5% to about 10%, inclusive; from about 0.8% to about 8%, inclusive; from about 1% to about 6%, inclusive; from about 1.4% to about 5%, inclusive; or from about 1.8% to about 4%, inclusive).

A polymer (e.g., thermoset, thermoplastic, or elastomer) may also be included in the binder. Suitable polymers can be any polymer or copolymer, including block copolymers, known for use in backing compounds for floor coverings. As non-limiting examples, polymers useful in the backing compounds described herein include polyolefins; polyesters, such as polyhydroxyalkanoate; vinyl polymers, such as polyvinyl chloride (PVC); urethanes; and epoxies. Optionally, the polymer can be a copolymer, such as poly(ethylene-propylene), ethylene-vinyl acetate (EVA), styrene-butadiene rubber (SBR), or poly(styrene-butadiene-styrene) (SBS). Useful EVA copolymers include those having vinyl acetate in a weight percent from about 1% to about 50%, such as from about 10% to about 40%, with the remainder being ethylene. Useful SBS polymers have a styrene content between 10% and 70% (w/w).

Some polymers useful in backing compounds are known as bitumen modifiers. These polymers, including EVA, SBS, and SBR, are generally incorporated into a backing compound by mixing at elevated temperatures (in general above 170° C.) and/or in a high shear mixer. Two common commercially available bitumen modifiers or are Kraton DSBS™ (an SBS block copolymer available from Kraton) and Polybilt 106™ (an EVA elastomer available from ExxonMobil). Some polymers are known as polyolefin polymer modifiers. Examples of commercially available polyolefin polymer modifiers include Vistamaxx™ granules (a propylene-ethylene copolymer, available from Exxon Mobile), Mirel™ granules (a polyhydroxyalkanoate, available from Metabolix).

In some examples, a backing compound described herein does not include a polymer. In other examples, a backing compound includes a polymer that is derived from a recycled material. In some examples, a backing compound described herein does not include PVC. In other examples, a backing compound does not include virgin PVC, but includes recycled PVC or PVC derived from a recycled material, such as recycled carpet tile. In some examples, a backing compound described herein includes a combination of virgin and recycled polymers, such as virgin and recycled PVC.

Where a polymer is included in the backing compound, it is preferably, but not necessarily, included in a weight percent no greater than 40% (w/w); no greater than 35% (w/w); no greater than 30% (w/w); no greater than 25% (w/w); no greater than 20% (w/w); no greater than 15% (w/w); no greater than 10% (w/w); and no greater than 5% (w/w). In some embodiments, the polymer is included in the backing compound in a weight percent of from about 1% to 30% (w/w), inclusive; from about 2% to 25% (w/w), inclusive; from about 3% to 20% (w/w), inclusive; from about 4% to 20% (w/w), inclusive; from about 4% to 15% (w/w), inclusive; from about 4% to 10% (w/w), inclusive; from about 10% to 20% (w/w), inclusive; from about 15% to 30% (w/w), inclusive; from about 15% to 25% (w/w), inclusive; from about 15% to 20% (w/w), inclusive; from about 20% to 30% (w/w), inclusive; and from about 22% to 28% (w/w), inclusive. The polymer may be present in a weight percent of from about 0% to about 30%, inclusive; from about 0.1% to about 25%, inclusive; from about 0.1% to about 20%, inclusive; from about 0.2% to about 10%, inclusive; from about 0.3% to about 8%, inclusive; from about 0.4% to about 6%, inclusive; from about 0.5% to about 4%, or inclusive; from about 0.75% to about 2.5%, inclusive).

The backing compound can also include additives that facilitate production of the backing compound or that impart desirable properties to the finished backing compound. As non-limiting examples, the backing compound can include an antioxidant, a hydrocarbon wax, a plasticizer, or a stabilizer. Additives can optionally be natural, bio-based, or recycled materials to contribute to the reduced carbon footprint of the floor covering. Additives can be present in the backing compound in weight percents from 0% to about 5%, inclusive.

In some examples, the backing compound further includes a hydrocarbon wax. The hydrocarbon wax can be present in a weight percent from about 0% to about 15% of the backing compound. In other examples, however, the backing compound is essentially free of a hydrocarbon wax. In some examples, the backing compound is free of bitumen.

In an embodiment, the backing compound comprises:
(1) from about 2% to about 25% (w/w), such as from about 5% to about 20% (w/w), more preferably from about 7% to about 15% (w/w), even more preferably from about 9% to about 13% (w/w), yet more preferably from about 10% to about 12% (w/w) of a first filler comprising concentrated carbon;
(2) from about 35% to about 65% (w/w), such as from about 40% to about 60% (w/w), from about 45% to about 55% (w/w), from about 50% to about 55% (w/w) of a second filler (i.e., not concentrated carbon);
(3) from about 2% to about 25% (w/w), such as from about 5% to about 20% (w/w), more preferably from about 7% to about 17% (w/w), even more preferably from about 10% to about 15% (w/w), yet more preferably from about 12% to about 14% (w/w) of a bio-based ester;
(4) from about 1% to about 10% (w/w), such as from about 2% to about 7% (w/w), from about 2% to about 5% (w/w), from about 2% to about 4% (w/w), from about 3% to about 4% (w/w) of an oil (preferably but not necessarily bio-based oil); and
(5) from about 2% to about 30% (w/w), such as from about 5% to about 25% (w/w), more preferably from about 10% to about 20% (w/w), even more preferably from about 15% to about 20% (w/w), of a polymer.

In an embodiment, the backing compound comprises:
(1) from about 20% to about 60% (w/w), such as from about 25% to about 55% (w/w), more preferably from about 30% to about 55% (w/w), even more preferably from about 35% to about 50% (w/w), yet more preferably from about 40% to about 55% (w/w), still more preferably from about 40% to about 50% (w/w) of a first filler comprising concentrated carbon;
(2) from about 0% to about 10% (w/w), such as from about 0% to about 5% (w/w) of a second filler (i.e., not concentrated carbon);
(3) from about 5% to about 35% (w/w), such as from about 10% to about 30% (w/w), more preferably from about 15% to about 30% (w/w), even more preferably from about 10% to about 25% (w/w), still more preferably from about 15% to about 23% (w/w), even still more preferably from about 18% to about 22% of a bio-based ester;
(4) from about 1% to about 10% (w/w), such as from about 2% to about 7% (w/w), from about 2% to about 5% (w/w), from about 2% to about 4% (w/w), from about 3% to about 4% (w/w) of an oil (preferably but not necessarily bio-based oil); and
(5) from about 5% to about 35% (w/w), such as from about 10% to about 30% (w/w), more preferably from about 15% to about 30% (w/w), even more preferably from about 20% to about 30% (w/w), of a polymer.

In an embodiment, the backing compound comprises:
(1) from about 15% to about 50% (w/w), such as from about 20% to about 45% (w/w), more preferably from about 25% to about 40% (w/w), even more preferably from about 30% to about 40% (w/w), yet more preferably from about 32% to about 38% (w/w) of a first filler comprising concentrated carbon;
(2) from about from about 2% to about 30% (w/w), such as from about 5% to about 25% (w/w), more preferably from about 10% to about 20% (w/w), even more preferably from about 15% to about 20% (w/w) of a second filler (i.e., not concentrated carbon);
(3) from about 15% to about 50% (w/w), such as from about 20% to about 45% (w/w), more preferably from about 25% to about 40% (w/w), even more preferably from about 30% to about 40% (w/w), yet more preferably from about 35% to about 40% (w/w) of a bio-based ester;
(4) from about 1% to about 15% (w/w), such as from about 2% to about 10% (w/w), such as from about 3% to about 9% (w/w), from about 4% to about 8% (w/w), from about 5% to about 7% (w/w), from about 6% to about 7% (w/w) of an oil (preferably but not necessarily bio-based oil); and
(5) from about 1% to about 15% (w/w), such as from about 2% to about 10% (w/w), from about 3% to about 8% (w/w), from about 4% to about 6% (w/w), from about 4% to about 5% (w/w) of a polymer.

In an embodiment, the backing compound comprises:
(1) from about 0% to about 10% (w/w), such as from about 0% to about 5% (w/w), such as from about 1% to about 3% (w/w), such as about 1% to about 2% of a first filler comprising concentrated carbon;
(2) from about 35% to about 65% (w/w), such as from about 40% to about 65% (w/w), from about 45% to about 60% (w/w), from about 50% to about 60% (w/w), from about 55% to about 60% (w/w) of a second filler (i.e., not concentrated carbon);
(3) from about 2% to about 25% (w/w), such as from about 4% to about 20% (w/w), more preferably from about 5% to about 15% (w/w), even more preferably from about 7% to about 12% (w/w), yet more preferably from about 9% to about 11% (w/w) of an oil (preferably but not necessarily bio-based oil); and
(4) from about 10% to about 45% (w/w), such as from about 20% to about 35% (w/w), more preferably from about 25% to about 35% (w/w), even more preferably from about 27% to about 33% (w/w), of a blend of recycled PVC and recycled carpet.

Inventive backing compounds ("BC") having the compositions shown in Table 4 were prepared as examples. Table 4 also compares the TRACI 2.1 GWP estimates of the inventive backing compounds with a conventional backing compound:

TABLE 4

| | Backing Compounds | | | | | | | | |
|---|---|---|---|---|---|---|---|---|---|
| | Conventional Backing Compound | Inventive Backing Compounds (BC) | | | | | | | |
| | | I | II | III | IV | V | VI | VII | VIII |
| FILLER | | | | | | | | | |
| concentrated carbon (%) | — | 14 | 14 | 8.25 | 8 | 25 | 25 | 55 | 25 |

TABLE 4-continued

Backing Compounds

| | | | | | | | | | |
|---|---|---|---|---|---|---|---|---|---|
| recycled filler (%) | — | — | — | 60.75 | 72 | — | — | — | — |
| other filler material (%) | 68 | 55.5 | 63.4 | — | — | 55 | 45 | — | 45 |
| BINDER | | | | | | | | | |
| bio-based ester (%) | — | — | — | — | 15.6 | 6.5 | 23.4 | 35.1 | 10 |
| bio-based oil (%) | — | — | 12.6 | — | 2.44 | 2.5 | 3.65 | 5.5 | — |
| recycled material (%) | — | 16.4 | 10 | — | — | — | — | — | — |
| EVA (%) | — | — | — | — | 1.46 | 8.5 | 2.2 | 3.3 | 12.5 |
| PVC (%) | 16.5 | — | — | — | — | — | — | — | — |
| SBS (%) | — | — | — | 3 | — | — | — | — | — |
| bitumen (%) | — | — | — | 28 | — | — | — | — | — |
| additives (%) | 15.5 | 14.1 | — | — | 0.5 | 2.5 | 0.75 | 1.1 | 7.5 |
| TRACI 2.1 GWP* (kg $CO_2$ eq/$m^2$) | +1.8 | −1.01 | −0.8 | | | | | | |

*based only on the material in the backing compound, not a cradle-to-gate life cycle assessment of the backing compound (i.e., estimate does not include transport of materials to factories, energy involved in fabricating the product, packaging, and production wastes and disposal).

Inventive Backing Compounds (BC)

| | IX | X | XI | XII | XIII | XIV | XV | XVI | XVII |
|---|---|---|---|---|---|---|---|---|---|
| FILLER | | | | | | | | | |
| concentrated carbon (%) | 11 | 50 | 50 | 35 | 1.4 | 1.4 | 8 | 33 | 33 |
| recycled filler (%) | — | — | — | — | — | — | — | — | — |
| other filler material (%) | 53.5 | 1 | 1 | 16.1 | 58.6 | 58.6 | 72 | 36 | 37 |
| BINDER | | | | | | | | | |
| bio-based ester (%) | 13.5 | 20 | 20 | 36 | — | — | 6.5 | 18 | 18 |
| bio-based oil (%) | 3 | 3 | — | 6.1 | 9.8 | 9.8 | 2 | 2 | 2 |
| recycled material (%) | — | — | — | — | 30 | 30 | — | — | — |
| EVA (%) | 18 | 25 | 25 | 4.5 | — | — | 8.5 | 8.5 | 8.5 |
| PVC (%) | — | — | — | — | — | — | — | — | — |
| SBS (%) | — | — | — | — | — | — | — | — | — |
| bitumen (%) | — | — | — | — | — | — | — | — | — |
| additives (%) | 1 | 1 | 4 | 2.3 | 0.2 | 0.2 | 3 | 2.5 | 1.5 |
| TRACI 2.1 GWP* (kg $CO_2$ eq/$m^2$) | −0.1 | −2.2 | −2.0 | −2.7 | −0.1 | −0.1 | −0.1 | −1.8 | −1.9 |

*based only on the material in the backing compound; not a cradle-to-gate life cycle assessment of the backing compound (i.e., estimate does not include transport of materials to factories, energy involved in fabricating the product, packaging, and production wastes and disposal).
Specification for each backing = 2.00 kg/$m^2$ The backing compound may be characterised in several ways according to known industry standards. As one example, the softening point and the consistency of the material can be determined. The softening point is a measure of the impact of temperature on the material consistency. The softening point may be determined using any method known in the art, and can, for example, be determined in accordance with the method described in EN1427:2007—*Bitumen and bituminous binders—Determination of the softening point—Ring and Ball method*. In suitable embodiments, the backing compound has a Ring and Ball softening point, as determined pursuant to EN1427:2007, in the range of 60-180° C., 70-160° C., 75-140° C., or 80-120° C.

The consistency of the backing material under specified conditions of temperature, load, and loading duration may be determined using any method known in the art, and can, for example, be measured in accordance with EN 1426:2007—*Bitumen and bituminous binders—Determination of needle penetration*. The consistency, also known as needle penetration, is expressed as the distance in tenths of a millimetre that a standard needle will penetrate into the material. In suitable embodiments, the backing compound has a needle penetration at 25° C., as determined pursuant to EN1426:2007, in the range of 0.2-200×0.1 mm, such as 0.5-100×0.1 mm, 0.8-75×0.1 mm, or 1-50×0.1 mm.

As reflected in Table 4, embodiments of the backing compounds described herein include significantly fewer synthetic and fossil fuel-based materials as compared to conventional backings. Moreover, the concentrated carbon present in at least some of the backing compounds can sequester carbon such that the backing compound, the backing composite, and optionally the resulting floor covering product, has a negative carbon footprint when subjected to a Life Cycle Assessment and measured pursuant to TRACI 2.1 methodology. In some embodiments, the reduction in the carbon footprint of embodiments of the backing compounds contemplated herein as compared to the conventional backing compound is at least 4 kg $CO_2/m^2$, at least 3.5 kg $CO_2/m^2$, or at least 3.5 kg $CO_2/m^2$.

Optionally, the backing layer can include one or more substrates adhered to or provided/embedded within the backing compound to form a backing composite. The substrate may be, for example, a glass veil, glass scrim, foam layer, or nonwoven covering (e.g. fleece). Optionally, the substrate can be located on the underside of the backing compound, such as a protective layer (e.g., fleece) to prevent the backing compound from sticking on or damaging the floor.

In some embodiments, the floor coverings described herein can sequester carbon such that the resulting product has a negative carbon footprint when subjected to a Life Cycle Assessment and measured pursuant to TRACI 2.1 methodology. The GWP of several carpet tiles ("CT") consistent with certain embodiments described herein are compared to a conventional tile in Table 5.

TABLE 5

| | Carpet Tiles | | | |
|---|---|---|---|---|
| | Conventional | Inventive Carpet Tiles | | |
| | Carpet Tile | CT I | CT II | CT III |
| Half Cloth | Conventional (Tables 2, 3) | HC I (Table 3) | HC I (Table 3) | HC II (Table 3) |
| Backing Composite | | | | |
| Backing Compound | Conventional (Table 4) | BC X (Table 4) | BC XI (Table 4) | BC XII (Table 4) |
| Backing Substrate* | Fiberglass layer | Fiberglass layer | Fiberglass layer | Fiberglass layer |
| TRACI 2.1 GWP (kg CO2 eq/$m^2$) (materials only**) | 6.8 | −1.1 to −1.0 | −0.9 to −0.8 | −1.3 to −1.2 |
| TRACI 2.1 GWP (kg CO2 eq/$m^2$) (estimated cradle-to-gate***) | 7.3 | −0.6 to −0.5 | −0.4 to −0.3 | −0.8 to −0.7 |

*not included in GWP, but identical for the conventional and inventive carpet tiles
**based only on the material in the backing compound.
***includes an estimate for the contribution of transport of materials to factories, energy involved in fabricating the product, packaging, and production wastes and disposal The floor coverings described above may be provided in any size or shape and may be used in a variety of different applications. In some embodiments a floor covering is provided in discrete tiles. For example, it may be provided in 50 cm×50 cm or 1 m×1 m square tiles. The tiles may be used in a variety of different interior applications, including, but not limited to, floor covering applications, wallcovering applications, countertops, backsplashes, etc.

A floor covering described herein can conform with a class designated by European classification EN1307-2014: *Textile floor coverings—Classification*. This European Standard specifies the requirements for classification of all textile floor coverings and carpet tiles, excluding rugs and runners (see ISO 2424:2007—*Textile floor coverings—Vocabulary*), into use classes with regard to one or more of the following properties: wear, appearance retention, additional performance properties and classes for luxury rating.

The floor coverings described herein can be prepared by standard methods known in the art. As one example, a floor covering described herein can be prepared by providing a textile top cloth with a top surface including yarn or fibers and a bottom surface including a precoat layer, providing a backing layer as described herein, and applying the backing layer onto the precoat layer on the bottom surface of the textile top cloth.

The floor coverings described herein can be installed on any interior surface. In some embodiments, a floor covering is installed by adhering it to an underlying surface. Optionally, the floor covering may be installed using a pressure sensitive adhesive that holds the floor covering in place during use but that permits removal of at least a portion of the floor covering, e.g., one or more tiles, without destroying the removed portion of the floor covering. In other embodiments, individual tiles of the floor covering are attached to each other but not to the underlying surface so as to create a floating installation. For example, the tiles may be held together using adhesive bearing connectors, such as disclosed in U.S. Pat. No. 7,464,510. Alternatively, a mechanical locking system may be formed along the edges of the modules (such as in the core) such that adjacent modules interlock to each other. One example of such a "click-lock" system is disclosed in U.S. Patent Application No. 2016/0208500, the entirety of which is herein incorporated by reference.

EXAMPLES

Example 1

A floor covering comprising an upper wear layer and a backing compound, wherein the backing compound comprises a binder and at least one filler, wherein the at least one filler comprises concentrated carbon.

Example 2

The floor covering of example 1, wherein the concentrated carbon has a carbon content of at least 85%.

Example 3

The floor covering of example 1 or example 2, wherein the concentrated carbon comprises less than 40 ppm of total polyaromatic hydrocarbons (PAH) and less than 15 ppm of total heavy metals.

Example 4

The floor covering of any one of example 1 to example 3, wherein the concentrated carbon has a particle size from about 0.01 μm to about 3 mm.

Example 5

The floor covering of any one of example 1 to example 4, wherein the concentrated carbon is present in the backing compound at a weight percent from about 1% to about 60% by weight.

Example 6

The floor covering of example 5, wherein the concentrated carbon is present in the backing compound at a weight percent from about 10% to about 50% by weight.

Example 7

The floor covering of example 6, wherein the concentrated carbon is present in the backing compound at a weight percent from about 20% to about 50% by weight.

Example 8

The floor covering of example 7, wherein the concentrated carbon is present in the backing compound at a weight percent from about 30% to about 50% by weight.

Example 9

The floor covering of any one of example 1 to example 8, wherein the at least one filler comprises a first filler comprising the concentrated carbon and a second filler comprising a silicate, a silica, an oxide of silica, a carbonate, a sulfate, an oxide of antimony, aluminum trihydrate, calcium oxide, fly ash, carbon black, talcum, a clay, kaolin, wood chips, wood flour, shell flour, a plant material, or a recycled material.

Example 10

The floor covering of example 9, wherein the first filler and the second filler are present in the backing compound at a combined weight percent from about 40% to about 70% by weight.

Example 11

The floor covering of example 10, wherein the first filler and the second filler are present in the backing compound at a combined weight percent from about 50% to about 70% by weight.

Example 12

The floor covering of any one of example 1 to example 11, wherein the binder comprises a bio-based ester.

Example 13

The floor covering of example 12, wherein the bio-based ester comprises an esterified rosin, hydrogenated rosin, phenolic rosin, or terpenic rosin.

Example 14

The floor covering of example 12 or example 13, wherein the bio-based ester is present in the backing compound at a weight percent from about 5% to about 40% by weight.

Example 15

The floor covering of any one of example 1 to example 14, wherein the binder comprises an oil, and wherein the oil comprises a plant, animal, or algae derived oil.

Example 16

The floor covering of example 15, wherein the oil comprises a plant derived oil and where the plant derived oil comprises rapeseed oil, sunflower oil, soybean oil, palm oil, castor oil, coconut oil, or refined versions thereof.

Example 17

The floor covering of example 15 or example 16, wherein the plant, animal, or algae derived oil is present in the backing compound at a weight percent from about 2% to about 15% by weight.

Example

The floor covering of any one of example 1 to example 17, wherein the binder comprises a polymer.

Example 19

The floor covering of example 18, wherein the polymer is present in the backing compound at a weight percent no greater than 30% by weight.

Example 20

The floor covering of example 18 or example 19, wherein the polymer comprises recycled polyvinyl chloride (PVC) or ethylene vinyl acetate (EVA).

Example 21

The floor covering of any one of example 1 to example 20, wherein the binder is essentially free of virgin PVC.

Example 22

The floor covering of any one of example 1 to example 21, wherein the floor covering is a carpet tile and the upper wear layer comprises a half cloth comprising yarn tufted into a tufting primary fabric and a precoat provided on an underside of the tufting primary fabric.

Example 23

The flooring covering of example 22, wherein the half cloth comprises a yarn face weight of no more than 18 osy.

Example 24

The floor covering of example 23, wherein the half cloth comprises a yarn face weight of no more than 12 osy.

Example 25

The floor covering of any one of example 22 to example 24, wherein the yarn comprises recycled nylon 6 or nylon 6,6.

Example 26

The floor covering of any one of example 22 to example 25, wherein the yarn comprises a denier of 900-1800, inclusive.

Example 27

The floor covering of example 26, wherein the yarn comprises a denier of 1200-1800, inclusive.

Example 28

The floor covering of any one of example 22 to example 27, wherein the half cloth comprises a tuft density of 140-300 tufts per inch, inclusive.

Example 29

The floor covering of any one of example 22 to example 28, wherein the yarn comprises a tuft height between $\frac{2}{32}$ inches and $\frac{3}{32}$ inches, inclusive.

Example 30

The floor covering of any one of example 22 to example 29, wherein the carpet tile achieves a rating of equal to or greater than 3.5 pursuant to the rating scale set forth in ASTM D7330-2015 when the carpet tile is subjected to the test method set forth in ASTM D5252-2015.

Example 31

The floor covering of any one of example 22 to example 30, wherein the precoat comprises a filler comprising concentrated carbon.

Example 32

The floor covering of any one of example 22 to example 31, wherein the precoat is devoid of a filler.

Example 33

The floor covering of any one of example 22 to example 32, wherein the precoat comprises a weight less than about 18 osy.

Example 34

The floor covering of any one of example 22 to example 33, wherein the half cloth comprises a weight from about 14 osy to about 35 osy.

Example 35

The floor covering of any one of example 1 to example 34, wherein the floor covering comprises a backing composite comprising the backing compound and a substrate, and wherein the backing composite is flexible.

Example 36

The floor covering of any one of example 1 to example 35, wherein the backing compound comprises a negative global warming potential (GWP) based on materials, calculated using TRACI 2.1 methodology

Example 37

The floor covering of any one of example 1 to example 36, wherein the entire floor covering comprises a negative cradle-to-gate GWP calculated using TRACI 2.1 methodology.

Example 38

A floor covering comprising an upper wear layer and a backing compound, wherein at least one of the upper wear layer or the backing compound comprises a negative GWP based on materials, calculated using TRACI 2.1 methodology.

Example 39

The floor covering of example 38, wherein the backing compound comprises a binder and at least one filler, and wherein the at least one filler comprises concentrated carbon present in the backing compound at a weight percent from about 1% to about 60% by weight.

Example 40

The floor covering of example 39, wherein the at least one filler comprises a first filler comprising the concentrated carbon and a second filler comprising a silicate, a silica, an oxide of silica, a carbonate, a sulfate, an oxide of antimony, aluminum trihydrate, calcium oxide, fly ash, carbon black, talcum, a clay, kaolin, wood chips, wood flour, shell flour, a plant material, or a recycled material.

Example 41

The floor covering of example 40, wherein the first filler and the second filler are present in the backing compound at a combined weight percent from about 40% to about 70% by weight.

Example 42

The floor covering of any one of example 39 to example 41, wherein the binder further comprises a bio-based ester present in the backing compound at a weight percent from about 5% to about 40% by weight.

Example 43

The floor covering of any one of example 39 to example 42, wherein the binder comprises a bio-based oil present in the backing compound at a weight percent from about 2% to about 15% by weight.

Example 44

The floor covering of any one of example 39 to example 43, wherein the binder comprises a polymer present in the backing compound at a weight percent no greater than 30% by weight.

Example 45

The floor covering of any one of example 39 to example 44, wherein the binder is essentially free of virgin PVC.

Example 46

The floor covering of any one of example 38 to example 45, wherein the floor covering is a carpet tile and the upper wear layer comprises a half cloth comprising yarn tufted into a tufting primary fabric and a precoat provided on an underside of the tufting primary fabric.

Example 47

The flooring covering of example 46, wherein the half cloth comprises a yarn face weight of no more than 18 osy.

Example 48

The floor covering of example 46 or example 47, wherein the yarn comprises recycled nylon 6 or nylon 6,6.

Example 49

The floor covering of any one of example 46 to example 48, wherein the yarn comprises a denier of 1200-1800, inclusive.

Example 50

The floor covering of any one of example 46 to example 49, wherein the precoat comprises a filler comprising concentrated carbon.

Example 51

The floor covering of any one of example 46 to example 50, wherein the precoat is devoid of a filler.

Example 52 The floor covering of any one of example 46 to example 51, wherein the precoat comprises a weight less than about 18 osy.

Example 53

The floor covering of any one of example 46 to example 52, wherein the half cloth comprises a weight from about 14 osy to about 35 osy.

Example 54

A flexible backing compound comprising a binder and a filler, wherein the binder comprises a bio-based ester, a bio-based oil, and a polymer, and wherein the filler comprises concentrated carbon.

Example 55

The flexible backing compound of example 54, wherein the polymer is ethylene vinyl acetate.

Example 56

The flexible backing compound of example 54 or example 55, wherein the binder does not comprise polyvinyl chloride.

Example 57

The flexible backing compound of any one of example 54 to example 56, wherein the bio-based ester is present in the backing compound in a weight percent from about 10% to about 40% by weight, wherein the bio-based oil is present in the backing compound in a weight percent from about 2% to about 10% by weight, wherein the polymer is present in the backing compound in a weight percent no greater than 30% by weight, and wherein the concentrated carbon is present in the backing compound in a weight percent of about 10% to about 55% by weight.

Example 58

The flexible backing compound of any one of example 54 to example 57, wherein the filler further comprises calcium carbonate.

Example 59

The flexible backing compound of any one of example 54 to example 57, wherein the backing compound comprises a negative global warming potential (GWP) based on materials, calculated using TRACI 2.1 methodology.

It will be understood that although the description of the floor coverings disclosed herein may refer to one or more "layers," once a floor covering is processed and ready for installation, the floor covering may be a bonded unitary integral structure in which the individual layers or the boundaries between the individual layers are not necessarily readily discernible and/or in which the individual layers are not separable from one another.

The subject matter of embodiments of the present invention is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Examples of the invention have been described for illustrative and not restrictive purposes, and alternative examples will become apparent to readers of this patent. Accordingly, the present invention is not limited to the examples described above, and various examples and modifications may be made without departing from the scope of the invention.

We claim:

1. A floor covering comprising an upper wear layer and a backing compound, wherein the backing compound comprises a binder and at least one filler, wherein the at least one filler comprises concentrated carbon, and wherein the concentrated carbon is present in the backing compound at a weight percent from about 10% to about 60% by weight.

2. The floor covering of claim 1, wherein the concentrated carbon has a carbon content of at least 85%.

3. The floor covering of claim 1, wherein the concentrated carbon comprises less than 40 ppm of total polyaromatic hydrocarbons (PAH) and less than 15 ppm of total heavy metals.

4. The floor covering of claim 1, wherein the concentrated carbon has a particle size from about 0.01 μm to about 3 mm.

5. The floor covering of claim 1, wherein the at least one filler comprises a first filler comprising the concentrated carbon and a second filler comprising a silicate, a silica, an oxide of silica, a carbonate, a sulfate, an oxide of antimony, aluminum trihydrate, calcium oxide, fly ash, carbon black, talcum, a clay, kaolin, wood chips, wood flour, shell flour, a plant material, or a recycled material.

6. The floor covering of claim 5, wherein the first filler and the second filler are present in the backing compound at a combined weight percent from about 40% to about 70% by weight.

7. The floor covering of claim 1, wherein the binder comprises a bio-based ester present in the backing compound at a weight percent from about 5% to about 40% by weight.

8. The floor covering of claim 1, wherein the binder comprises a bio-based oil.

9. The floor covering of claim 8, wherein the bio-based oil comprises a plant derived oil and wherein the plant derived oil comprises rapeseed oil, sunflower oil, soybean oil, palm oil, castor oil, coconut oil, or refined versions thereof.

10. The floor covering of claim 8, wherein the bio-based oil is present in the backing compound at a weight percent from about 2% to about 15% by weight.

11. The floor covering of claim 1, wherein the binder comprises a polymer.

12. The floor covering of claim 11, wherein the polymer is present in the backing compound at a weight percent no greater than 30% by weight.

13. The floor covering of claim 11, wherein the polymer comprises recycled polyvinyl chloride (PVC) or ethylene vinyl acetate (EVA).

14. The floor covering of claim 1, wherein the binder is essentially free of virgin PVC.

15. The floor covering of claim 1, wherein the binder comprises a bio-based ester present in the backing compound in an amount from about 10% to about 40% by weight, a bio-based oil present in the backing compound in an amount from about 2% to about 10% by weight, and a polymer present in the backing compound in an amount no greater than 30% by weight.

16. The floor covering of claim 1, wherein the floor covering is a carpet tile and the upper wear layer comprises a half cloth comprising yarn tufted into a tufting primary fabric and a precoat provided on an underside of the tufting primary fabric.

17. The flooring covering of claim 16, wherein the half cloth comprises a yarn face weight of no more than 18 osy.

18. The floor covering of claim 16, wherein the yarn comprises recycled nylon 6 or nylon 6,6.

19. The floor covering of claim 16, wherein the yarn comprises a denier of 900-1800, inclusive.

20. The floor covering of claim 16, wherein the half cloth comprises a tuft density of 140-300 tufts per inch, inclusive.

21. The floor covering of claim 16, wherein the yarn comprises a tuft height between $2/32$ inches and $3/32$ inches, inclusive.

22. The floor covering of claim 16, wherein the precoat comprises a filler comprising concentrated carbon.

23. The floor covering of claim 16, wherein the precoat is devoid of a filler.

24. The floor covering of claim 16, wherein the precoat comprises a weight less than about 18 osy.

25. The floor covering of claim 16, wherein the half cloth comprises a weight from about 14 osy to about 35 osy.

26. The floor covering of claim 1, wherein the backing compound comprises a negative global warming potential (GWP) based on materials, calculated using TRACI 2.1 methodology.

27. The floor covering of claim 1, wherein the entire floor covering comprises a negative cradle-to-gate GWP calculated using TRACI 2.1 methodology.

28. The floor covering of claim 1, wherein the backing compound is flexible.

* * * * *